US00RE39825E

(19) United States
(12) Reissued Patent
Morris et al.

(10) Patent Number: US RE39,825 E
(45) Date of Reissued Patent: Sep. 11, 2007

(54) ROOF BATTEN

(75) Inventors: Richard J. Morris, Prior Lake, MN (US); Lars J. Walberg, Eagle, CO (US)

(73) Assignee: Diversi Plast Products, Inc., Golden Valley, MN (US)

(21) Appl. No.: 10/805,686

(22) Filed: Mar. 19, 2004

Related U.S. Patent Documents

Reissue of:
(64) Patent No.: 6,357,193
Issued: Mar. 19, 2002
Appl. No.: 09/465,099
Filed: Dec. 16, 1999

U.S. Applications:
(60) Provisional application No. 60/112,597, filed on Dec. 17, 1998.

(51) Int. Cl.
*E04B 7/00* (2006.01)
*E04D 1/00* (2006.01)

(52) U.S. Cl. ..... 52/553; 52/198; 52/199
(58) Field of Classification Search ..... 52/783.11, 52/783.17, 783.18, 783.19, 198, 199, 302.1, 52/302.3, 553, 747.11, 747.12, 745.06; 428/186, 428/188, 184, 185, 102, 223, 166, 178
See application file for complete search history.

(56) References Cited

U.S. PATENT DOCUMENTS

| | | | | |
|---|---|---|---|---|
| 1,163,034 A | | 12/1915 | Phippen | |
| 2,042,586 A | * | 6/1936 | Campbell et al. | 428/102 |
| 3,185,070 A | | 5/1965 | Smith | |
| 3,236,170 A | * | 2/1966 | Meyer et al. | 454/365 |
| 3,647,606 A | * | 3/1972 | Notaro | 428/184 |
| 3,878,574 A | * | 4/1975 | Erickson | 5/413 R |

(Continued)

FOREIGN PATENT DOCUMENTS

| | | | |
|---|---|---|---|
| DE | 2 939 730 A1 | | 4/1981 |
| DE | 44 21 941 A1 | | 1/1996 |
| GB | 2 062 056 A | | 5/1981 |
| GB | 2062056 A | * | 5/1981 |
| GB | 2127060 A | * | 4/1984 |
| GB | 2243169 A | * | 10/1991 |
| JP | H09-177198 | | 7/1997 |
| WO | WO 98/15701 | | 4/1998 |

OTHER PUBLICATIONS

*CORAVENT,* "The Ridge Vent With the Shingle on Top", 8 pages.
*CORAVENT,* "The New Concept in Tile Roof Ventilation", 4 pages, Dec. 1, 1990.

(Continued)

*Primary Examiner*—Naoko Slack
(74) *Attorney, Agent, or Firm*—Patterson, Thuente, Skaar & Christensen, P.A.

(57) ABSTRACT

A roof batten for use in spacing tiles or similar exterior roofing members from a roof overlayment is provided. In one embodiment, the batten includes at least one layer of a corrugated plastic material with a pair of generally planar plies and a convoluted ply cooperating with the planar plies to define a multiplicity of passages. The passages allow drainage of water infiltrating the tiles and further promote drying.

REEXAMINATION RESULTS

The questions raised in reexamination request no. 90/007, 487, filed Mar. 19, 2004 have been considered and the results thereof are reflected in this reissue patent which constitutes the reexamination certificate required by 35 U. S. C. 307 as provided in 37 CFR 1.570(e), for ex parte reexaminations, or the reexamination certificate required by 35 U. S. C. 316 as provided in 37 CFR 1.997(e) for inter partes reexaminations.

12 Claims, 4 Drawing Sheets

U.S. PATENT DOCUMENTS

| | | | | | |
|---|---|---|---|---|---|
| 3,889,892 | A | | 6/1975 | Melead | |
| 3,949,657 | A | | 4/1976 | Sells | |
| 4,178,914 | A | | 12/1979 | Erb | 126/674 |
| D257,282 | S | | 10/1980 | Roberts | |
| D257,283 | S | | 10/1980 | Roberts | |
| 4,418,505 | A | | 12/1983 | Thompson | |
| 4,445,306 | A | | 5/1984 | Schauffele | |
| 4,718,211 | A | | 1/1988 | Russell et al. | |
| 4,803,813 | A | | 2/1989 | Fiterman | |
| 4,807,409 | A | | 2/1989 | Sells | |
| 4,817,506 | A | * | 4/1989 | Cashman | 454/365 |
| 4,843,953 | A | | 7/1989 | Sells | |
| 4,942,699 | A | | 7/1990 | Spinelli | |
| 5,005,330 | A | | 4/1991 | Todisco | |
| 5,022,314 | A | | 6/1991 | Waggoner | |
| 5,048,689 | A | | 9/1991 | McFarland | 206/586 |
| 5,054,254 | A | | 10/1991 | Sells | |
| 5,092,225 | A | | 3/1992 | Sells | |
| 5,094,041 | A | | 3/1992 | Kasner et al. | |
| 5,099,627 | A | | 3/1992 | Coulton et al. | |
| 5,197,252 | A | | 3/1993 | Tiscareno | |
| 5,242,736 | A | | 9/1993 | Van Erden et al. | |
| 5,304,095 | A | | 4/1994 | Morris | |
| 5,319,908 | A | | 6/1994 | Van Erden et al. | |
| 5,328,407 | A | | 7/1994 | Sells | |
| 5,331,783 | A | | 7/1994 | Kasner et al. | |
| 5,349,804 | A | | 9/1994 | Van Erden et al. | |
| 5,419,867 | A | | 5/1995 | Van Erden et al. | |
| 5,427,571 | A | | 6/1995 | Sells | |
| 5,469,795 | A | | 11/1995 | Moorman | |
| 5,471,807 | A | | 12/1995 | Vasquez | |
| 5,509,987 | A | | 4/1996 | Dahlquist | |
| 5,577,360 | A | | 11/1996 | Gibbs | |
| 5,591,933 | A | * | 1/1997 | Li et al. | 89/36.02 |
| 5,603,657 | A | | 2/1997 | Sells | |
| 5,617,690 | A | | 4/1997 | Gibbs | |
| 5,641,551 | A | | 6/1997 | Simpson et al. | 428/43 |
| 5,651,734 | A | | 7/1997 | Morris | |
| 5,673,521 | A | | 10/1997 | Coulton et al. | |
| 5,711,116 | A | | 1/1998 | Hasan | |
| 5,794,396 | A | | 8/1998 | Gibbs | |
| 5,816,014 | A | | 10/1998 | Tzeng et al. | |
| 5,879,778 | A | * | 3/1999 | Barnes | 428/102 |
| 5,947,817 | A | | 9/1999 | Morris et al. | |
| 6,357,193 | B1 | | 3/2002 | Morris | |

OTHER PUBLICATIONS

*CORAVENT,* "Hip Roof Application #5", 2 pages, Apr. 15, 1992.

*CORAVENT,* "Strip Vent Application #7", 2 pages, Apr. 15, 1992.

*CORAVENT,* "Tile Roof Application #9", 2 pages, Apr. 15, 1992.

*Western Roofing,* "Fire and Air—Proper Attic Ventilation Poses Problem in Fire Areas", 1 page, May/Jun. 1993.

*CORAVENT,* Reference Drawing, 1 page, Feb. 1995.

*ICBO Evaluation Service, Inc.,* Evaluation Report, "Filing Category: Roof Covering and Roof Deck Construction—Roof Covering", 11 pages, Jan. 1, 1999.

*ES Report,* ICBO Evaluation Service, Inc., "Filing Category: Roof Covering and Roof Deck Construction—Roof Covering", 3 pages, May 1, 2002.

*ES Legacy Report,* ICC Evaluation Service, Inc., "Legacy Report on the 1997 *Uniform Building Code,* the 2000 *International Building Code* and the 2000 *International Residential Code",* 2 pages, Dec. 1, 2003.

*ICC Evaluation Service, Inc.,* "Acceptance Criteria for Plastic Battens Used in Clay or Concrete Tile Roof Systems", 4 pages, 2004.

First Amended Answer and Counterclaims, filed Apr. 15, 2005, U.S. District Court, District of Utah.

Reply to Defendant's First Amended Answer and Counterclaims, filed May 3, 2005, U.S. District Court, District of Utah.

Complaint for Patent Infringement, 2:04 CV 01005 PGC, U.S. District Court, District of Utah, Oct. 29, 2004.

Answer to Complaint and Counterclaim, 2:04 CV 01005 PGC, U.S. District Court, District of Utah, Jan. 14, 2005.

Reply to Defendant's Answer and Counterclaims, 2:04 CV 01005 PGC, U.S. District Court, District of Utah, Feb. 4, 2005.

Memorandum of Law in Support of Plaintiff's Motion to Strike Defendant's Affirmative Defense of Inequitable Conduct, 2:04 CV 01005 PGC, U.S. District Court, District of Utah, Feb. 3, 2005.

Opposition to Plaintiff's Motion to Strike Battels Plus' Defense of Inequitable Conduct, 2:04 CV 01005 PGC, U.S. District Court, District of Utah, Feb. 22, 2005.

Reply Memorandum of Law in Support of Plaintiff's Motion to Strike Defendant's Affirmative Defense of Inequitable Conduct, 2:04 CV 01005 PGC, U.S. District Court, District of Utah, Feb. 28, 2005.

Declaration of Randall T. Skaar, 2:04 CV 01005 PGC, U.S. District Court, District of Utah, Feb. 28, 2005.

Complaint for Patent Infringement, 2:04 CV 01005 PGC, U.S. District Court, District of Utah, Oct. 29, 2004.

Answer to Complaint and Counterclaim, 2:04 CV 01005 PGC, U.S. District Court, District of Utah, Jan. 14, 2005.

Reply to Defendant's Answer and Counterclaims, 2:04 CV 01005 PGC, U.S. District Court, District of Utah, Feb. 4, 2005.

Memorandum of Law in Support of Plaintiff's Motion to Strike Defendant's Affirmative Defense of Inequitable Conduct, 2:04 CV 01005 PGC, U.S. District Court, District of Utah, Feb. 3, 2005.

Opposition to Plaintiff's Motion to Strike Battels Plus' Defense of Inequitable Conduct, 2:04 CV 01005 PGC, U.S. District Court, District of Utah, Feb. 22, 2005.

Reply Memorandum of Law in Support of Plaintiff's Motion to Strike Defendant's Affirmative Defense of Inequitable Conduct, 2:04 CV 01005 PGC, U.S. District Court, District of Utah, Feb. 28, 2005.

Declaration of Randall T. Skaar, 2:04 CV 01005 PGC, U.S. District Court, District of Utah, Feb. 28, 2005.

Cor–A–Vent S–400 "Cold Roof" Application, Jul. 1, 1997.

* cited by examiner

ROOF BATTEN

Matter enclosed in heavy brackets [ ] appears in the original patent but forms no part of this reissue specification; matter printed in italics indicates the additions made by reissue.

CROSS-REFERENCES TO RELATED APPLICATIONS

This application claims priority under 35 U.S.C. §119(e) to, and hereby incorporates by reference, U.S. Provisional Application No. 60/112,597, filed Dec. 17, 1998.

FIELD OF THE INVENTION

This invention relates to roof coverings and, in particular, this invention relates to building materials or devices which extend the lives of tile roofs by preventing water infiltration.

BACKGROUND OF THE INVENTION

Most tile roofs include an exterior decking or sheathing, which overlays a structural framework of either trusses or rafters. Typically, decking includes plywood sheets or other planking members. One or more layers of overlayment, such as felt (tar) paper, is usually attached to the decking. Battens are normally placed over the felt paper before tiles are installed. The battens are usually fixed to the roof by fasteners, such as nails or staples, driven through the battens and felt paper and into the roof decking. Battens are typically wood strips and serve to separate the tiles from the overlayment. Separation between tiles and overlayment is necessary to ensure that water infiltrating the tiles onto the felt paper evaporates quickly. If water is otherwise allowed to stand or pool, the water may infiltrate through the felt paper and penetrate the roof decking, thereby potentially causing deterioration of the roof decking and the underlying framework. When horizontal batting is installed, water which has infiltrated the roof tiles tends to pool on the upper-slope sides of the battens, thereby potentially causing roof deterioration.

Means previously used to avert or diminish the likelihood of deterioration to tile roofs due to water pooling and infiltration include leaving gaps between adjacent battens and cutting drainage channels on the undersides of the battens. These means have been largely ineffective and have often added to the expense and time necessary for tile roof installation as well.

As depicted in FIG. 1, roof 20 has installed thereon counter batten system 22 of the prior art. Counter batten system 22 includes vertical battens 24 overlaid with horizontal riser strips 26. Typically, vertical battens 24 are ⅜ by 1½ inch wooden boards, often four feet in length. Vertical battens 24 are typically installed every 16 inches, on center. Horizontal riser strips 26 are typically wooden lathes and are installed atop vertical battens 24 at spacings determined by the dimensions of the tiles to be installed. While counter batten system 22 is somewhat effective in eliminating pooled water, the expense and time required to install counter batten system 22 is often prohibitive.

There is then a need for a device or roofing material which spaces tile from underlaying roofing and structural members, which greatly reduces or eliminates water pooling when water infiltrates the roof tile system, and which may be installed quickly and efficiently.

SUMMARY OF THE INVENTION

This invention substantially meets the aforementioned needs. There is provided a spacer operatively disposable between a roof decking and an exterior roofing material. The spacer may include at least one layer of a material, the material defining a multiplicity of passages therethrough. The passages defined may extend generally transversely to a longitudinal axis of the spacer and may allow infiltrated liquids to drain therethrough, thereby preventing accumulation of the infiltrated liquids. The spacer may further include a generally planar first ply and a convoluted second ply cooperating to define the multiplicity of passages. A plurality of first plies and a generally convoluted second ply may be present. The second ply may include a multiplicity of cross-plies extending between the first plies. The spacer may include a plurality of layers. Each adjacent layer of the spacer may be hingably connected. The layers, when assembled in a stacked relationship, may be fastened together by stitching, staples, glue, hot air welding, ultrasonic welding, infrared bonding, other methods known to the art, or any combination thereof.

There is also provided a tile roof system, the tile roof system including an overlayment, a tile, and a batten. The batten may be disposable between the tile and the overlayment and may include at least one layer of a material defining a multiplicity of passages therethrough, the passages extending generally transversely to a longitudinal axis of the batten and allowing infiltrated liquids to drain therethrough.

There is further provided a method of installing a tile on a roof with a slope. The method may include the step of providing first and second battens, each batten comprising at least one layer of a material defining a multiplicity of air passages therethrough. The defined passages may extend generally transversely to a longitudinal axes of the batten and may allow infiltrated liquids to drain therethrough. The method may further include the step of fixing the first and second battens on the roof such that longitudinal axis of the first and second battens are generally parallel and extend generally horizontally to the roof's slope. The method may further include the step of fixing the tile atop the first and second battens.

DETAILED DESCRIPTION OF THE DRAWINGS

Figure 1:
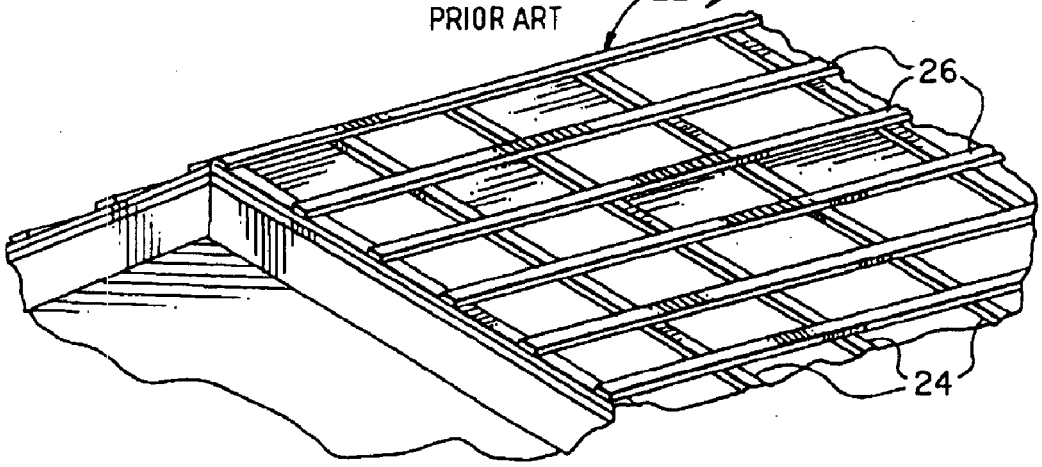
Fig. 1 PRIOR ART
FIG. 1 is a perspective view of a roof of the prior art with a counter-batten system installed thereon.
Figure 2:
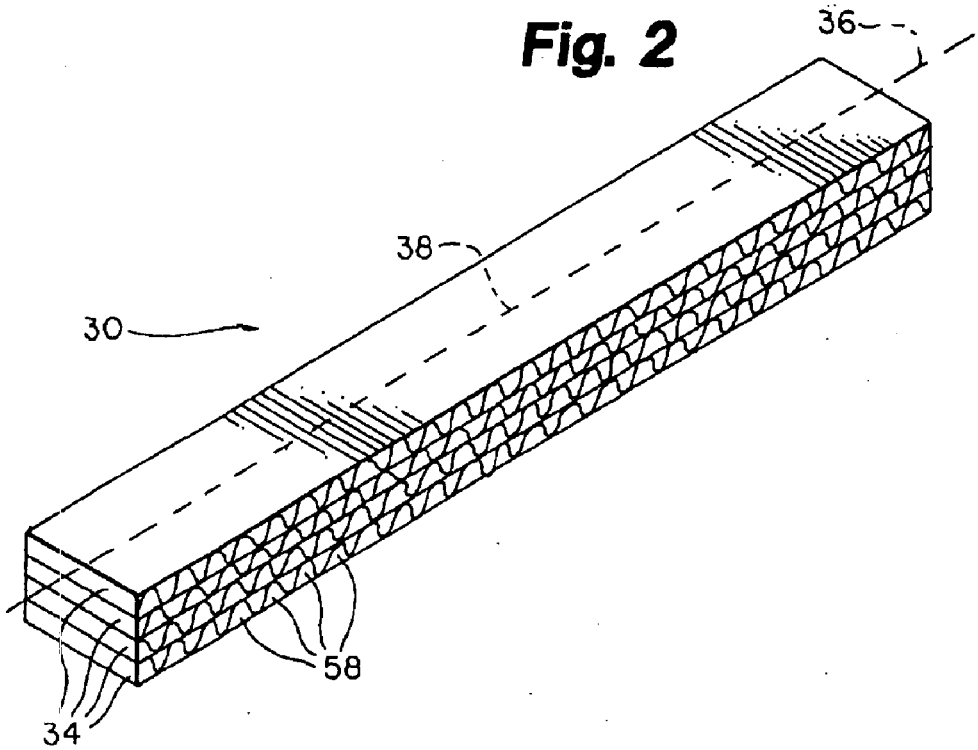
FIG. 2 is a perspective view of one embodiment of the batten of this invention.
Figure 3:
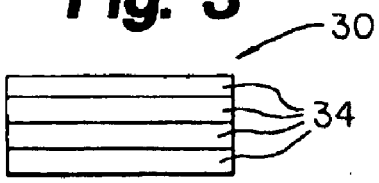
FIG. 3 is an end view of the batten of FIG. 2.

Referring to FIGS. 2 and 3, exemplary batten (spacer) 30 is depicted. Batten 30 generally includes one or more layers 34 and may be characterized by longitudinal axis 36. Layers 34 are described below and generally serve two functions. The first function is to allow water to drain therethrough. The second is to enable air exchange. These complimentary functions prevent water pooling and promote drying on roofs on which batten 30 is installed. While one or more layers 34 are contemplated to be within the scope of this invention, if a plurality of layers 34 are present, these layers may be stacked and fixed to each other by such means as stitching 38. However, other fastening means which may be used include hot air welding (or other fastening means using thermal energy), ultrasonic welding, infrared bonding, staples, glue, or other methods known to the art.

Figure 4:
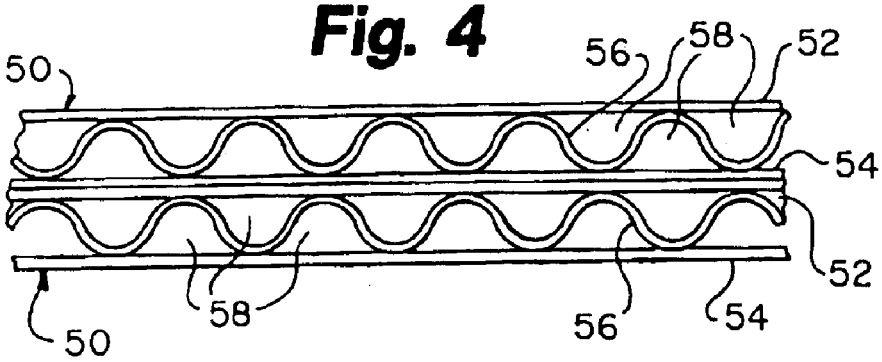
FIG. 4 is a fragmentary, cross-sectional view of a first embodiment of two layers of the batten of FIG. 2.

One embodiment of two layers of layer 34 is depicted in FIG. 4 generally as layers 50. Each layer 50 includes planar plies 52 and 54 and convoluted ply 56. Convoluted ply 56 is disposed between and bonded to (or otherwise cooperates with) planar plies 52 and 54 to define a multiplicity of air channels 58 therebetween.

Figure 5:
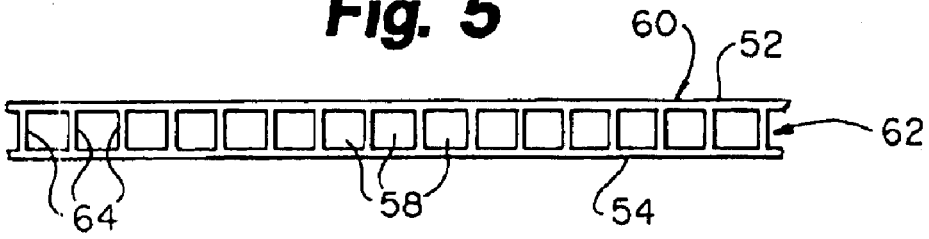
FIG. 5 is a fragmentary, cross-sectional view of a second embodiment of one layer of the batten of FIG. 2.

Another embodiment of layer 34 is depicted in FIG. 5 generally as layer 60. Layer 60 includes planar plies 52 and 54 and second ply 62. Second ply 62 includes a multiplicity of cross-plies 64. Cross-plies 64 extend generally perpendicular (or otherwise transversely) between planar plies 52 and 54. Thus, planar plies 52 and 54 and second ply 62 cooperate to define a multiplicity of channels 58 therebetween.

Figure 6:
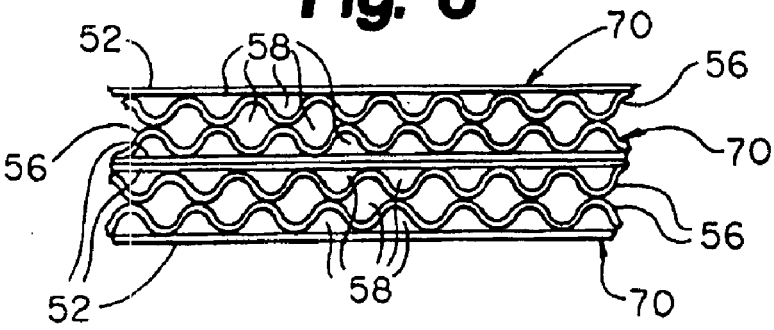
FIG. 6 is a fragmentary, cross-sectional view of a third embodiment of four layers of the batten of FIG. 2.

Referring to FIG. 6, yet another embodiment of layers 34 is depicted generally as four layers 70. Each layer 70 includes planar ply 52 and convoluted ply 56. Planar and convoluted plies 52 and 56 are bonded to (or otherwise cooperate with) each other to define a multiplicity of channels 58 therebetween. Layers 70 may be stacked such that convoluted plies 56 abut, thereby defining another multiplicity of channels 58 therebetween.

These embodiments of layers 34 include a corrugated plastic (resin) material with a nominal weight appropriate for the structure, and often between a range of about 140 and 160 pounds per thousand square feet. One nominal weight may be about 150 pounds per thousand square feet. The plastic resin may have a 4.0 to 4.5-millimeter profile. The plastic resin may further include an about 4.0 (±0.2) millimeter profile. The plastic material may still further be black and include ultraviolet (UV) inhibitors to enable the plastic resin to withstand extended exposure to direct UV light. The plastic resin may include a high-density, polyethylene, corrugated, plastic resin with a brittleness temperature of about −103.0 degrees F., a deflection temperature of about a +162.0 degrees F. at 66 pounds per square inch, a burn rate of about 2.5 inches per minute, a self-ignition temperature of about 734.0 degrees F., and may also merit a label of "excellence" for smoke density of a 9.3 percent average.

Figure 7:
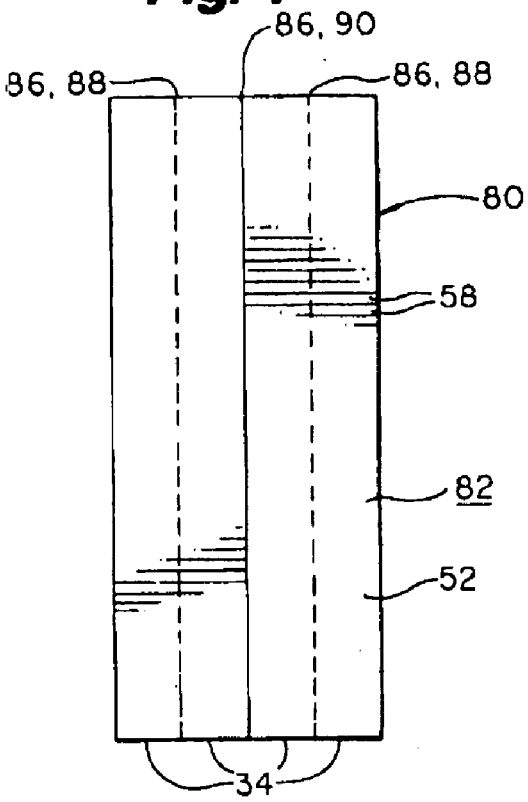
FIG. 7 is a plan view of a sheet of convoluted material suitable for forming the batten of FIG. 2.
Figure 8:
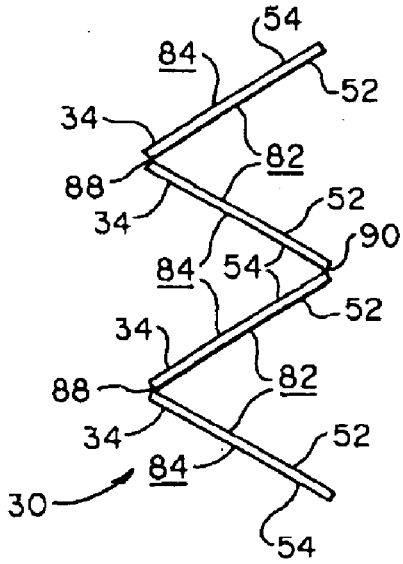
FIG. 8 is a side plan view of the sheet of FIG. 7 being foldably assembled into the batten of FIG. 2 after layers have been defined therein.

Referring to FIGS. 7 and 8, exemplary sheet 80 may be formed of the materials discussed with respect to FIG. 4 and further described above. Thus, sheet 80 includes a multiplicity of channels 58 defined by a cooperation of members such as planar plies 52 and 54 and convoluted ply 56. Sheet 80 displays first and second surfaces 82 and 84. Exemplary layers 34 may be formed from sheet 80 by the slit-scoring technique or by the nick-scoring technique, each technique being more fully described below. Alternatively, layers 34 may be formed by completely severing sheet 80 generally along lines 86. Separate layers 34 are then stacked and fixed as described above.

The slit-scoring technique is described in U.S. Pat. No. 4,803,813, issued to Fitterman on Feb. 14, 1989, the entire contents of which are hereby incorporated by reference. In the slit-scoring technique, hingelines 88 alternate with hingelines 90. Hingelines 88 are defined by extending a slit generally along a line 86 and parallel (or generally transversely) to channels 58. The slit extends through planar ply 54 and convoluted ply 56, thereby leaving planar ply 52 intact. Hingelines 90 are defined by extending a slit generally along a line 86 and generally parallel to hingelines 88. The slit extends through planar ply 52 and convoluted ply 56, thereby leaving planar ply 54 intact. Intact planar plies 52 and 54 are thus used as hinges and batten 30 is assembled by Z-folding layers 34 along hingelines 88 and 90 in the manner depicted in FIG. 8.

The nick-scoring technique is an alternative hinge-forming technique described in U.S. Pat. No. 5,094,041, issued to Kasner et al., on Mar. 10, 1992, the entire contents of which are hereby incorporated by reference. In the nick-scoring technique, lines 86 include a series of generally linear perforations. Each perforation substantially extends through planar plies 52 and 54 and convoluted ply 56. Substantially intact portions of planar plies 52 and 54 and convoluted ply 56 remain between perforations. Lines 86 are thusly formed into hinges and thereby define layers 34. Layers 34 may be Z-folded along lines 86 in a manner substantially resembling FIG. 8 to assemble batten 30.

Still another hinge-forming technique includes forming completely separated layers 34 and hingably connecting adjacent layers 34 with a pliable adhesive member such as tape.

Channels 58 extend generally perpendicularly, or otherwise transversely, to longitudinal axis 36 of batten 30. As more fully described below, batten 30 is installed in generally horizontal rows on a roof. Channels 58 therefore allow water to drain therethrough, preventing water pooling and enabling air exchange once tiles, or other similar materials, are installed.

Figure 9:
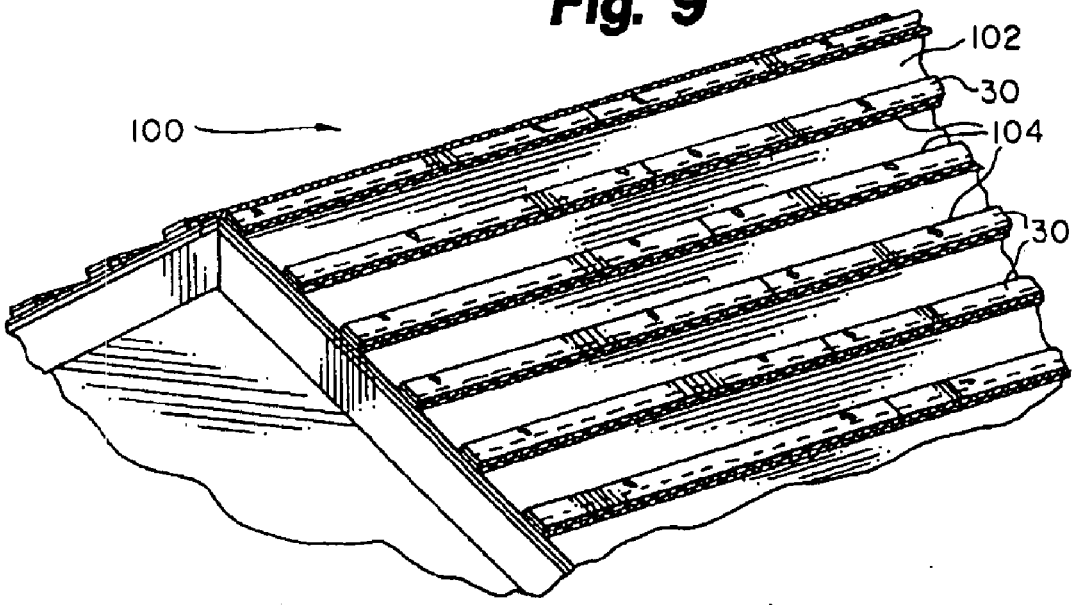
FIG. 9 is a perspective view of an exemplary roof upon which battens of FIG. 2 have been installed.
Figure 10:
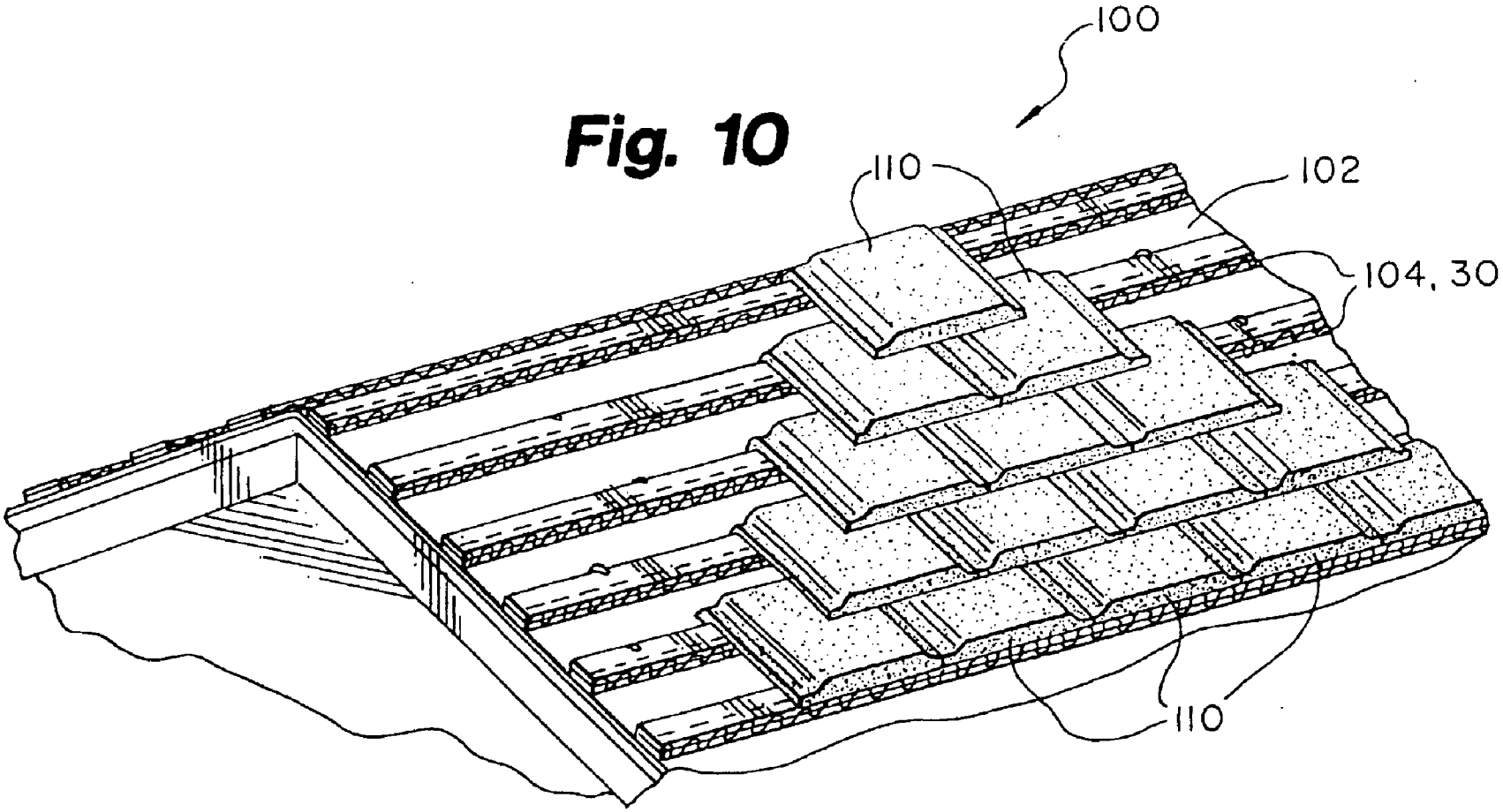
FIG. 10 is a plan view of tiles installed atop the batten of FIG. 2 on the roof of FIG. 9.

As depicted in FIG. 9, roof 100 includes overlayment 102 installed over a decking member as described above. Battens 30 are fixed to roof 100 in generally parallel rows 104. Rows 104 extend substantially horizontally with respect to the slope of roof 100. The distance between rows 104 is determined by the dimensions of the tiles or other materials to be installed. As depicted in FIG. 10, exterior roofing members such as tiles 110, are installed atop battens 30. Thusly installed on a roof, battens 30 function to space tile 110 from the remainder of roof 100 and to drain water which has infiltrated between installed tiles 110, thereby preventing the infiltrated water from pooling atop overlayment 102 and preventing the water from penetrating into the decking and structural members of roof 100. Also as installed on roof 100, channels 58 of battens 30 serve as conduits for air exchange beneath tiles 110, thereby further promoting evaporation of infiltrating water.

Exemplary roof batten 30 may be about ⅜ inches in thickness, 1½ inches in width, and include two hinged segments 48 inches in length. However, many other dimensions are contemplated to be within the scope of this invention. Exemplary roof batten 30 may be utilized with clay or cement tiles, including flat tiles, S-tiles, and barrel tiles. Moreover, while exemplary roof batten 30 is depicted as being used in conjunction with roof tiles, other exterior roof materials including slate, clay, metal, and cedar may also be installed using exemplary roof batten 30.

Batten 30 of this invention thereby promotes ventilation and prevents water accumulation beneath tiles or similar exterior roofing members. The result of installing the batten of this invention is thusly a roof, which remains drier and is more protected from decomposition and damage than if battens of the prior art were used. The roof batten of this invention will not rot, warp, or absorb water as do many of the wooden roof battens of the prior art. Exemplary batten 30 further eliminates excessive nail protrusion through roof coverings, which can also promote water penetration and roof damage. Roof batten 30 of this invention may also enable a substantial decrease in time and expense necessary to install a tile roof as compared to lathe-batten systems of the prior art. Because one embodiment of roof batten 30 includes a pliable, yet resilient resin, tile breakage during installation is reduced when workers step on installed tiles. Other benefits of utilizing batten 30 includes elimination of waste and wood splinters during installation. Exemplary battens 30 also weigh less than wooden battens. In contrast to wood battens, battens 30 are easily cut to desired lengths with utility knives.

Because numerous modifications may be made of this invention without departing from the spirit thereof, the scope of the invention is not to be limited to the embodiments illustrated and described. Rather, the scope of the invention is to be determined by appended claims and their equivalence.

What is claimed is:

[1. A tile roof system, comprising:

an overlayment;

a tile; and a batten disposable between the tile and the overlayment, the batten comprising:

at least one layer comprising a generally planar first ply and a second ply, the first and second plies cooperating to define a multiplicity of passages extending generally transversely to a longitudinal axis of the batten.]

2. [The batten of claim 1,] *A tile roof system, comprising in combination:*

*an overlayment;*

*a rigid tile; and*

*a batten disposed between the tile and the overlayment, the batten comprising:*

*at least one layer comprising generally planar first plies and a second ply, the first and second plies cooperating to define a multiplicity of passages extending generally transversely to a longitudinal axis of the batten, and* in which the second ply includes a multiplicity of cross plies extending between the first plies.

3. [The batten of claim 1,] *A tile roof system, comprising in combination:*

*an overlayment;*

*a rigid tile; and*

*a batten disposed between the tile and the overlayment, the batten comprising:*

*at least one layer comprising generally planar first plies and a second ply, the first and second plies cooperating to define a multiplicity of passages extending generally transversely to a longitudinal axis of the batten, and* in which the second ply is generally convoluted.

4. The batten of claim 3, in which a pair of first plies is present.

5. The batten of claim 4, in which a plurality of layers are present.

6. The batten of claim 5, in which adjacent layers are hingably connected by a hingeline extending generally parallel to [a] *the* batten longitudinal axis.

7. The batten of claim 6, in which the hingeline is defined by a slice extending through the second ply and one of the first plies.

8. The batten of claim 6, in which first and second hingelines are present, the first hingeline defined by a first slice extending through one of the first plies and the second ply, and the second hingeline defined by a second slice extending through [the other] *another* of the first plies and the second ply.

9. The batten of claim 6, in which *a plurality of hingelines are present,* the [hingeline is] *hingelines* defined by alternate severed and intact portions, the severed portions comprising substantially severed first and second plies, the intact portions comprising substantially intact first [and second] plies.

10. The batten of claim 5, in which the layers are stacked and fastened together.

11. The batten of claim 10, further comprising means for fastening the layers together.

12. The batten of claim 10, in which the layers are fastened together by stitching.

13. The batten of claim 10, in which the layers are fastened together by fasteners selected from the group consisting of staples, glue, hot air welding, stitching, ultrasonic welding, infrared bonding, and any combination thereof.

[14. A method of installing a tile on a roof with a slope, comprising the steps of:

providing first and second battens, each batten comprising at least one layer of a material comprising first and second plies defining a multiplicity of air passages therethrough, the passages extending generally transversely to a longitudinal axis of the batten;

fixing the first and second battens on the roof such that longitudinal axes of the first and second battens are generally parallel and extend generally horizontally to the roof slope; and fixing the tile atop the first and second battens.]

[15. The method of claim 14, in which the layer comprises a first and second generally planar ply and a generally convoluted ply disposed between the first and second plies.]

[16. The method of claim 15, in which the provided battens comprise a plurality of layers.]

[17. The method of claim 16, in which the layers further comprise means for fixing said layers in a stacked relationship.]

[18. The method of claim 17, in which the fixing means includes stitching.]

[19. The method of claim 17, in which the fixing means is selected from the group consisting of staples, glue, hot air welding, stitching, ultrasonic welding, infrared bonding, and any combination thereof.]

[20. The method of claim 15, in which the provided battens comprise a plurality of hingably-connected layers.]

[21. A spacer operatively disposable between a roof decking and an exterior roof material and comprising a plurality of stacked layers, each layer comprising a generally planar first ply and a second ply cooperating with the first ply to define a multiplicity of passages, the passages extending generally transversely to a longitudinal axis of the spacer, the layers fastened together by stitching, adjacent layers connected by a hingeline extending generally parallel to the spacer longitudinal axis.]

[22. A spacer operatively disposable between a roof decking and an exterior roof material and comprising a plurality of stacked, completely separated layers fastened together by stitching, each layer comprising a generally planar first ply and a second ply cooperating with the first ply to define a multiplicity of passages, the passages extending generally transversely to a longitudinal axis of the spacer.]

* * * * *

US00RE39825C1

(12) INTER PARTES REEXAMINATION CERTIFICATE (0369th)

United States Patent
Morris et al.

(10) Number: US RE39,825 C1
(45) Certificate Issued: Apr. 17, 2012

(54) ROOF BATTEN

(75) Inventors: Richard J. Morris, Prior Lake, MN (US); Lars J. Walberg, Eagle, CO (US)

(73) Assignee: Diversi-Plast Products, Inc., Golden Valley, MN (US)

Reexamination Request:
No. 95/000,185, Dec. 4, 2006

Reexamination Certificate for:

| | |
|---|---|
| Patent No.: | **Re. 39,825** |
| Issued: | **Sep. 11, 2007** |
| Appl. No.: | **10/805,686** |
| Filed: | **Mar. 19, 2004** |

Related U.S. Patent Documents

Reissue of:

| | |
|---|---|
| (64) Patent No.: | **6,357,193** |
| Issued: | **Mar. 19, 2002** |
| Appl. No.: | **09/465,099** |
| Filed: | **Dec. 16, 1999** |

Related U.S. Application Data

(60) Provisional application No. 60/112,597, filed on Dec. 17, 1998.

(51) Int. Cl.
*E04B 7/00* (2006.01)
*E04D 1/00* (2006.01)

(52) U.S. Cl. ..... 52/553; 52/198; 52/199

(58) Field of Classification Search ..... None
See application file for complete search history.

(56) References Cited

To view the complete listing of prior art documents cited during the proceeding for Reexamination Control Number 95/000,185, please refer to the USPTO's public Patent Application Information Retrieval (PAIR) system under the Display References tab.

*Primary Examiner*—Catherine S. Williams

(57) ABSTRACT

A roof batten for use in spacing tiles or similar exterior roofing members from a roof overlayment is provided. In one embodiment, the batten includes at least one layer of a corrugated plastic material with a pair of generally planar plies and a convoluted ply cooperating with the planar plies to define a multiplicity of passages. The passages allow drainage of water infiltrating the tiles and further promote drying.

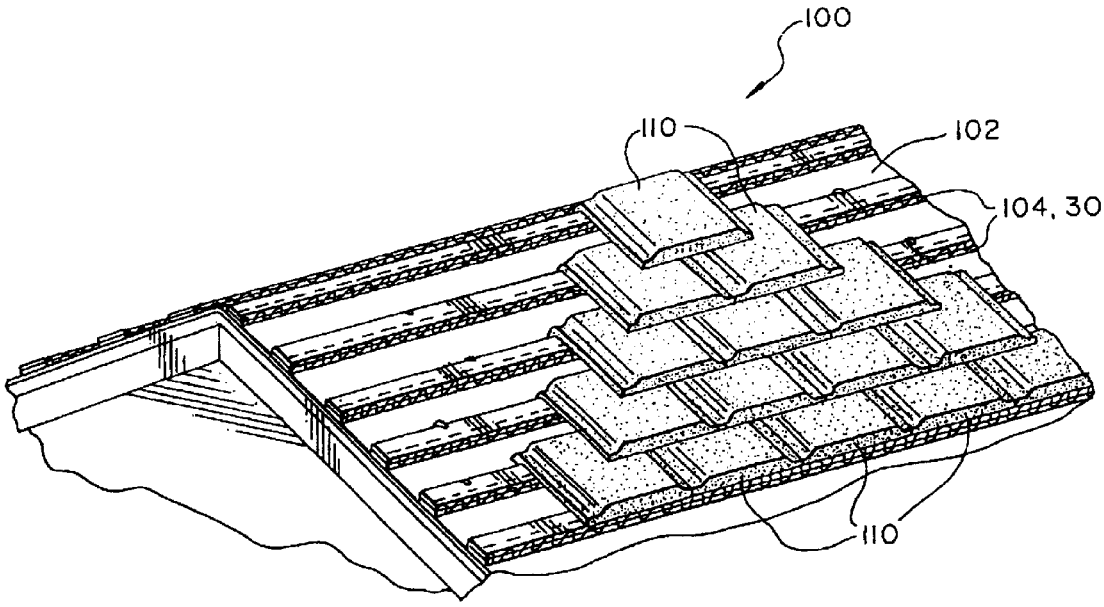

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the original patent but was deleted by the reissue patent; matter in italics was added by the reissue patent. Matter enclosed in heavy double bracket [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

Claims 1 and 14-22 were previously cancelled.

Claims 4 and 5 are cancelled.

Claims 2, 3, 6 and 10 are determined to be patentable as amended.

Claims 7-9 and 11-13, dependent on an amended claim, are determined to be patentable.

New claims 23-29 are added and determined to be patentable.

2. [The batten of claim 1, ] *A tile roof system, comprising in combination:*

*an overlayment;*

*a rigid tile; and*

*a batten disposed between the tile and the overlayment, the batten comprising;*

*at least one layer comprising generally planar first plies and a second ply, the first and second plies cooperating to define a multiplicity of passages extending generally transversely to a longitudinal axis of the batten, and* in which the second ply includes a multiplicity of cross plies extending between the first plies[.]; wherein each batten further comprises a second layer, the second layer comprising a pair of first plies spaced apart by a second ply, the second ply of the second layer comprising a multiplicity of cross plies, each of the first plies of the second layer presenting an outer surface; wherein the outer surface of one of the first plies of the second layer confronting one of the first plies of the at least one layer.

3.[The batten of claim 1,] *A tile roof system, comprising in combination:*

*an overlayment;*

*a rigid tile; and*

*a batten disposed between the tile and the overlayment, the batten comprising:*

*at least one layer comprising generally planar first plies and a second ply, the first and second plies cooperating to define a multiplicity of passages extending generally transversely to a longitudinal axis of the batten, and* in which the second ply is generally convoluted[[.]], and wherein a pair of first plies and a plurality of layers are present.

6. The batten of claim [[5]] 3, in which adjacent layers are hingably connected by a hingeline extending generally parallel to[a] *the* batten longitudinal axis.

10. The batten of claim [[5]] 3, in which the layers are stacked and fastened together.

23. A tile roof system, comprising:

a decking member;

an overlayment on the decking member, a plurality of rigid tiles, and a plurality of elongate plastic battens disposed on the overlayment and arranged in a plurality of spaced apart, generally parallel rows, each batten presenting a longitudinal axis and comprising at least a first layer, the first layer including a pair of generally planar first plies and a second ply the first plies spaced apart and oriented generally parallel with each other, the second ply disposed between the spaced apart first plies and including a multiplicity of cross plies extending between the first plies the first plies and the cross plies defining a multiplicity of immediately adjacent passages extending transversely to the longitudinal axis of the batten the plurality of rigid tiles disposed on the rows of battens such that the plurality of rigid tiles is spaced apart from the overlayment by the battens and the plurality of rigid tiles is supported on the battens, wherein both the first plies and all of the cross plies are of substantially equal thickness.

24. The tile roof system of claim 23, wherein each cross ply presents a thickness dimension of about 4 mm.

25. The tile roof system of claim 23, wherein each of the first plies presents a thickness dimension of about 4 m.

26. The tile roof system of claim 23, wherein each cross ply is oriented generally perpendicular to each of the first plies.

27.The tile roof system of claim 23, wherein each batten further comprises a second layer, the second layer including a pair of generally planar first plies spaced apart by a second ply, an outer surface of one of the first plies of the second layer directly confronting an outer surface of one of the first plies of the first layer.

28. The tile roof system of claim 23, wherein each of the first plies of each batten presents an outwardly facing surface, a distance between the outwardly facing surfaces of the first plies defining a thickness dimension of the batten, and wherein a height dimension of each of the passages defined by the first and second plies is substantially equal to the thickness dimension of the batten.

29. The tile roof system of claim 23, wherein each of the first plies presents an outwardly facing surface, the outwardly facing surfaces being substantially equal in area.

* * * * *